UNITED STATES PATENT OFFICE.

LUKE W. OSBORN, OF JOLIET, ASSIGNOR TO THOMAS C. MILLS, OF MILLSDALE, ILLINOIS.

VULCANIZED PAINT.

SPECIFICATION forming part of Letters Patent No. 456,659, dated July 28, 1891.

Application filed April 25, 1891. Serial No. 390,463. (No specimens.)

*To all whom it may concern:*

Be it known that I, LUKE W. OSBORN, a citizen of the United States, residing at Joliet, in the county of Will and State of Illinois, have invented certain new and useful Improvements in Vulcanized Paints, which is fully set forth in the following specification.

My invention relates to the production of a paint which shall provide an elastic pliable coating for roofs and other locations where such a paint is desirable.

The invention consists in a paint composed of gum-turpentine, flaxseed-mucilage, and linseed-oil heated and then vulcanized with sulphur.

In preparing this paint I employ the crude gum of the pine-tree, known in commerce as "gum-turpentine," and to any certain quantity of the same I add about five per cent., by weight, of linseed-oil for the purpose of properly softening the gum. The quantity required will vary somewhat according to the state of the gum. If it is very hard, more oil will be required, while if already soft less should be used, the oil in any case being added in quantity sufficient to make the gum quite soft and plastic. The gum and oil added thereto are heated to about 225° to 230° Fahrenheit, or the gum may first be melted by the application of about this degree of heat and the oil then added. To this hot liquid I then add about fifty per cent., of liquid measurement, of a quite thick stiff flaxseed-mucilage. This mucilage I prepare by boiling and straining flaxseed. The ingredients are well mixed together and kept at about the temperature mentioned above, and there is then added to the hot mixed liquids about fifteen to twenty per cent., by weight, of sulphur, this being the average quantity of sulphur required to vulcanize the mass. The quantity of sulphur demanded will, however, vary somewhat, according to the condition of the gum, and in all instances it must be sufficient to thoroughly vulcanize the liquid compound. I also prefer to add to the compound a small quantity of silicate of soda—say in about the proportion of two ounces thereof to a gallon of the paint. This silicate of soda acts as a drier to harden the paint, and is sometimes desirable, though I do not make it an essential ingredient. The addition of the mucilage to the gum produces a mixture which when vulcanized is pliable, elastic, and tough. The result of the process above is a liquid somewhat similar to a hydrocarbon treated with sulphur. The liquid, when spread and allowed to cool and harden, forms a thin sheet or film which is quite pliable and elastic and is suitable for use as a paint where these properties are desirable. The paint must be applied hot and may be used without any substance added or with some additional material, for the purpose, however, of finish only. For instance, in coating roofs and sides of buildings, either brick or wood, I sometimes add crushed specular hematite ore, white sand, or any other like material that will improve the appearance of the surface when finished.

This paint hardens as it cools, but is sufficiently pliable and elastic to withstand the changes due to contraction and expansion under changes in temperature, so that it provides a very durable and satisfactory paint. It is sufficiently elastic to stand the bending of a surface to which it is applied—tin, for instance, or other sheet metal—so that it may be applied not only to articles made of such material, but even to the sheets of metal before bending.

Having thus described my invention, what I claim as new, and desire to secure by Letters Patent, is—

1. The herein-described paint, composed of gum-turpentine, linseed-oil, flaxseed-mucilage, and sulphur, in about the proportions specified, and thoroughly vulcanized, substantially as described.

2. A paint composed of gum-turpentine, linseed-oil, flaxseed-mucilage, silicate of soda, and sulphur, in about the proportions specified, and vulcanized by the application of heat, substantially as specified.

LUKE W. OSBORN.

Witnesses:
CARRIE FEIGEL,
A. M. BEST.

Correction in Letters Patent No. 456,659.

It is hereby certified that the name of the assignee in Letters Patent No. 456,659, granted July 28, 1891, upon the application of Luke W. Osborn, of Joliet, Illinois, for an improvement in "Vulcanized Paint," was erroneously written and printed "Thomas C. Mills," whereas said name should have been written and printed *Thomas O. Mills;* and that the said Letters Patent should be read with this correction therein that the same may conform to the record of the case in the Patent Office.

Signed, countersigned, and sealed this 11th day of August, A. D. 1891.

[SEAL.]

CYRUS BUSSEY,
*Assistant Secretary of the Interior.*

Countersigned:
    W. E. SIMONDS,
        *Commissioner of Patents.*